April 29, 1958     W. C. PITTMAN     2,832,183
TRACTOR MOUNTED RECIPROCATING CUTTING ASSEMBLY
Filed July 31, 1956     2 Sheets-Sheet 1
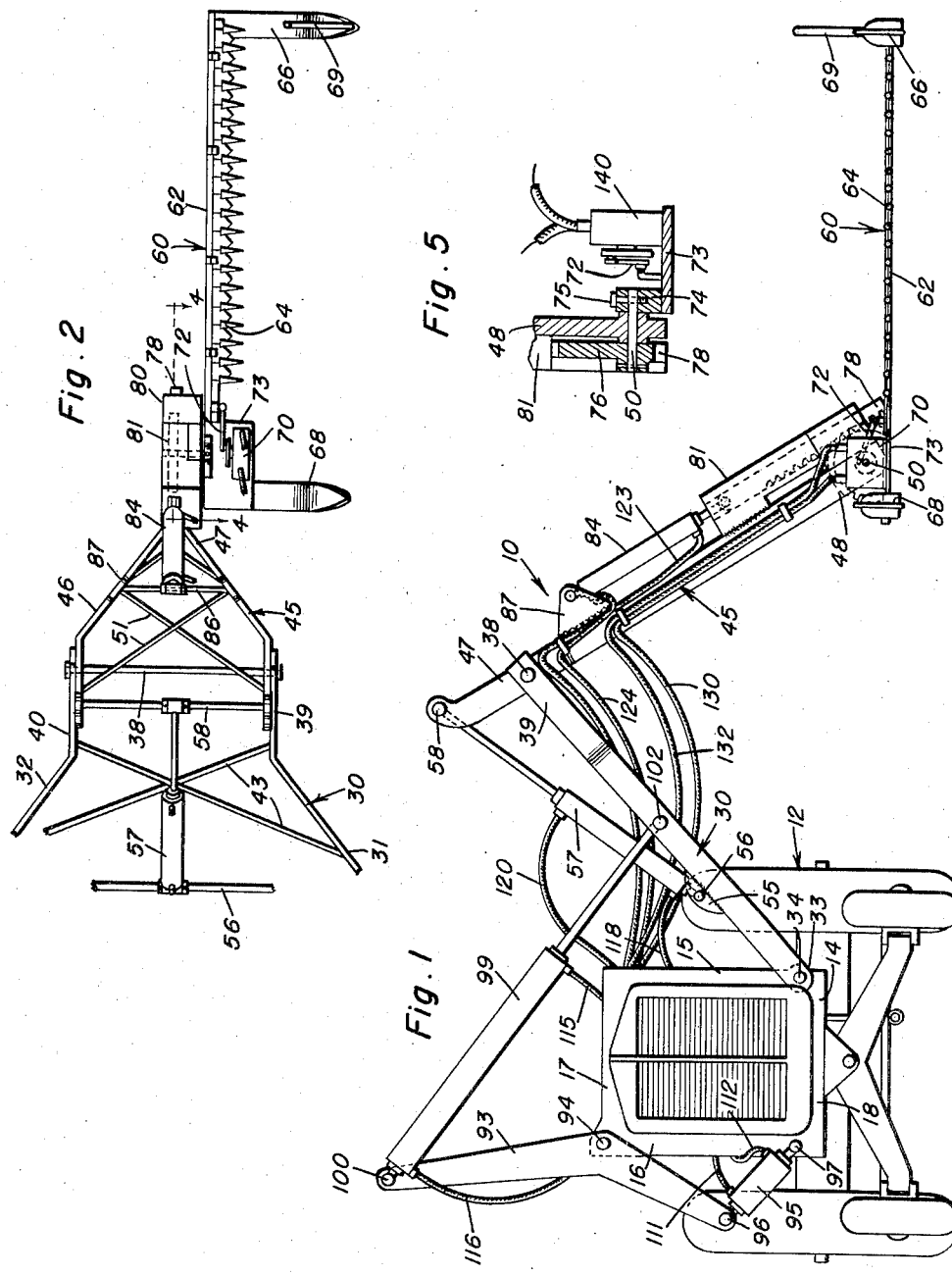
William C. Pittman
INVENTOR.

April 29, 1958     W. C. PITTMAN     2,832,183
TRACTOR MOUNTED RECIPROCATING CUTTING ASSEMBLY
Filed July 31, 1956     2 Sheets-Sheet 2
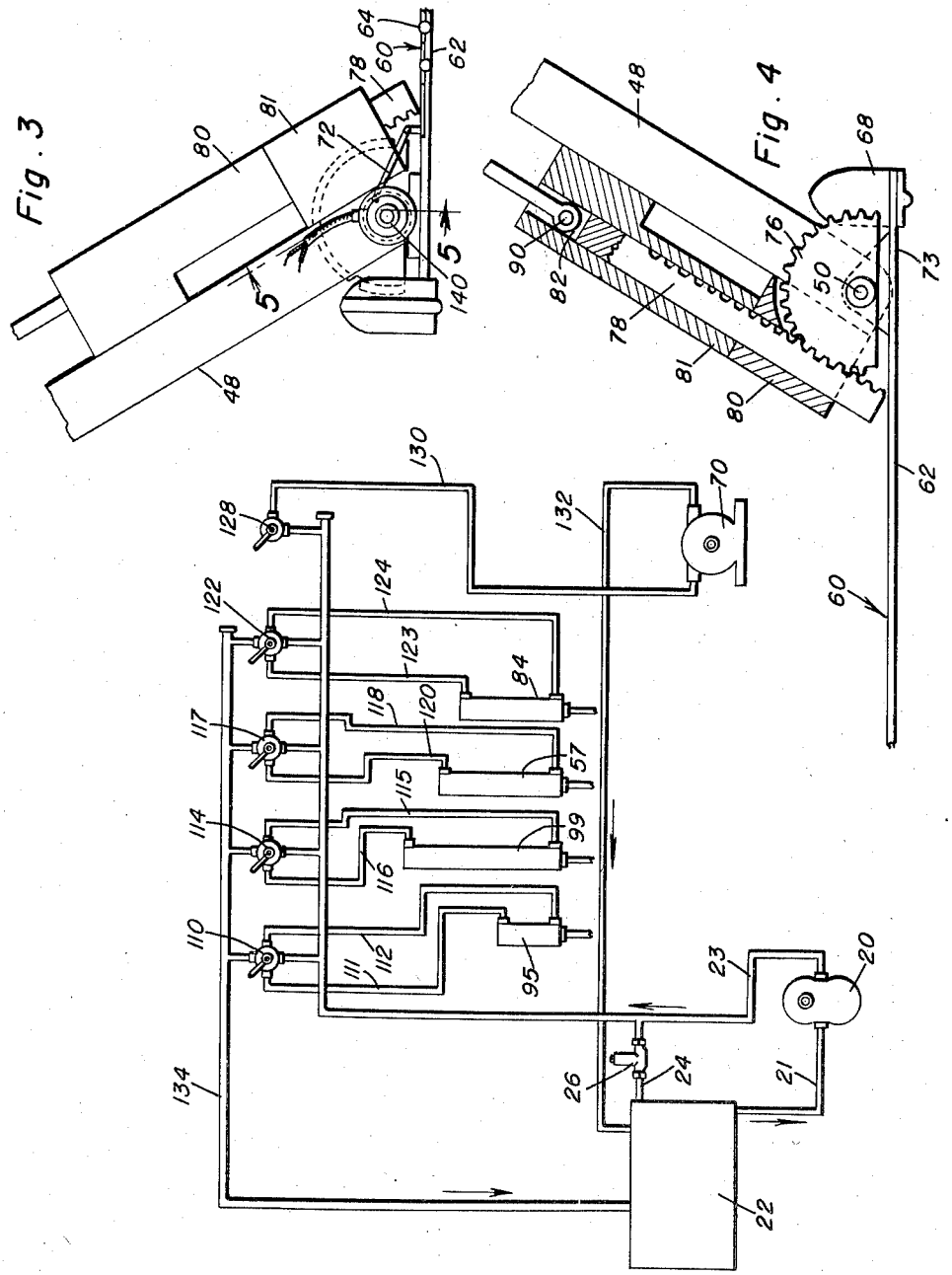
William C. Pittman
INVENTOR.

United States Patent Office 2,832,183
Patented Apr. 29, 1958

2,832,183

TRACTOR MOUNTED RECIPROCATING CUTTING ASSEMBLY

William C. Pittman, Maysville, Mo.

Application July 31, 1956, Serial No. 601,146

3 Claims. (Cl. 56—25)

This invention relates to mowers and more particularly to adjustable mowers that are adapted to be carried by a vehicle.

An object of the present invention is to provide an improved mower for a motor vehicle, for example a tractor, the mower having a novel assembly of frames and means to adjust the frames to selected positions for cutting on inclined surfaces, flat surfaces and for reaching over obstacles, for example, a fence alongside a road and mowing on the other side thereof.

A further object of the present invention is to provide a mechanically simplified extension arm mower which is easily controlled in order to permit unskilled workers or skilled maintenance crews to mow highway rights-of-way quickly and effectively, reducing the effort and labor involved and at the same time increasing the speed at which the job is done.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front view of a typical motor vehicle in which the principles of the invention are applicable by way of an adjustable extension mower carried by the tractor of Figure 1;

Figure 2 is a fragmentary plan view of the mower;

Figure 3 is an enlarged view of a modified form of the invention;

Figure 4 is a fragmentary sectional view taken on the plane of line 4—4 of Figure 2 and showing particularly the means to adjust the mower unit with respect to its supporting frame;

Figure 5 is a sectional view taken approximately on the line 5—5 of Figure 3, and;

Figure 6 is a schematic view of a typical hydraulic circuit which is used to actuate the various hydraulic devices to adjust the extension mower in accordance with the desires and needs of the workman.

In the accompanying drawings the principles of the invention are demonstrated by way of an extension mower 10 applied to a standard motor vehicle 12. This motor vehicle is a tractor that has a chassis to which the support 14 is secured. This support has sides 15 and 16 together with a top and bottom 17 and 18 respectively. Other standard parts of the tractor are the hydraulic pump 20 (Figure 6) that has an inlet pipe 21 extending from tank 22 and an outlet pipe 23 extending from the pump. This outlet pipe has a by-pass return line 24 in which pressure operated valve 26 is disposed. This is standard equipment for the tractor.

The extension mower is made of a first frame 30 that has sides 31 and 32 whose inner ends 33 are mounted on pivot 34, the latter being carried by support 14. The inner end of side 32 is mounted on a similar pivot on a rear part of the tractor or support attached to the tractor. The pivot for the arm 32 is coaxial with the pivot 34 whereby frame 30 is capable of swinging upwardly and downwardly and projects generally laterally of the tractor. The outer end of first frame 30 has a pivot pin 38 passed through aligned openings in it, these openings being in the parallel parts 39 and 40 of sides 31 and 32. Sides 31 and 32 are supported by diagonal braces 43 (Figure 2).

Pivot pin 38 attaches second frame 45 to the outer end of first frame 30 whereby the second frame is capable of being pivotally removed with respect to the first. This second frame includes sides 46 and 47 which converge to a structural support 48 (Figure 5) through which pivot pin 50 passes. Sides 46 and 47 of second frame 45 are braced as at 51, the bracing being diagonal and/or transverse and secured by spot welding or other means. Pivot pin 38 passes through aligned openings in parallel parts of the sides 46 and 47 and is disposed between the upper and lower ends of the second frame whereby the upper end of the second frame protrudes above the outer extremity of the first frame 30.

The sides 31 and 32 of first frame 30 have ears 55 secured thereto for the purpose of accommodating the pivot pin 56. An extensible hydraulic device, for example, hydraulic cylinder 57, is pivoted at one end on the pin 56 between the ends thereof and is pivoted at the other end to the transverse bar 58 and is secured to the upper end of each side 46 and 47 of second frame 45. Actuation of the hydraulic device, therefore, causes the second frame to be pivotally oscillated with respect to the first frame.

Mower unit 60 is carried by the lower end of the second frame 45. The mower unit 60 consists of a stationary bar 62 on which oscillatable cutter bar 64 is operatively arranged. Guide shoes 66 and 68 are at the ends of the mower unit with shoes 66 having a guide 69 rising upwardly therefrom. In the embodiment of Figures 1 and 2, the movable cutter bar is actuated by a hydraulic motor 70 whose drive shaft operates the pitman 72 pivotally connected to an eccentric on the drive shaft and pivotally connected to the movable cutter bar of the mower unit 60. Hydraulic motor 70 is mounted on a support 73, the latter being secured to and forming a part of the stationary cutter bar. Support 73 has a bracket 74 fixed thereto, pivot pin 50 passing into the bracket and being fixed thereto, as by bolt 75 (Figure 5). A gear segment 76 is secured to pivot pin 50, as by being pinned thereto, and is enmeshed with a rack gear 78 that functions to pivotally adjust the position of the mower unit 60 with respect to the frame 45. Accordingly, guides 80 and 81 are fixed to the extremity 48 of the second frame 45 and they have a single passage 82 formed therein to constrain the motion of the rack 78 to rectilinear. This holds the rack gear teeth enmesh with the teeth of the segment 76 so that any longitudinal movement of the rack gear is transmitted to pivotal movement of the mower unit 60. A hydraulic device 84, such as a cylinder with a piston in it, is mounted for pivotal movement on a cross member 86, the latter being carried by brackets 87 on the sides of the second frame 45. The opposite extremity of the hydraulic power device is pivoted as at 90 (Figure 4) to the rack 78.

A lever 93 is pivoted by pin 94 to the support 14. This lever has a hydraulic power device connected to one end. This device 95 is connected by pivot pin 96 to the lower end of lever 93 and connected by pivot pin 97 to support 14. Accordingly, actuation of the hydraulic power device 95 causes the lever to be adjusted about pivot 94 to thereby lift or lower the first and second frames as a unit. Motion of lever 93 is transmitted to the frames 30 and 45 by an extensible hydraulic power device 99, preferably consisting of a piston and cylinder, which is pivoted to the first frame and to the lever. Pivot pin 100 is attached at the upper extremity of the lever 93 and to the hydraulic device 99. The hydraulic power device is pivoted on a cross member 102 extending between the sides 31 and 32 of first frame 30. Accordingly, any movement of the lever 93 caused by device 95 is transmitted to the first frame through the hydraulic extensible device 99. On the other hand, any adjustment of the hydraulic device 99 insofar as an extension or retraction is concerned, is imparted to the frame 30 independently of any motion of the hydraulic device 95. This is to permit a greater range of adjustment for the first frame 30 without having excessively long extensible hydraulic cylinders.

The hydraulic system in the tractor (Figure 6) is used for actuating all of the hydraulic equipment in the mower. The pipe 23 extending from the hydraulic pump 20 extends to valve 110 which, through pipe lines 111 and 112 applies fluid under pressure to the double-acting cylinder-piston assembly that constitutes the hydraulic power device 95. Valve 114 is similarly fed with fluid under pressure, and through pipe lines 115 and 116, the hydraulic device 99 is supplied. Valve 117, through pipe lines 118 and 120 applies fluid under pressure to the hydraulic device 57. Valve 122, through lines 123 and 124 applies fluid under pressure to the hydraulic device 84. Finally, valve 128 supplied from pipe 123, applies fluid under pressure through pipe line 130 to the motor 70, whence the fluid returns through return line 132 to the tank 22. Valves 110, 114, 117 and 122 are communicated with a common return 134 which terminates in registry with the tank 22.

In use, the mower unit 60 is operated by actuation of the valve 128, causing fluid under pressure to flow through hydraulic motor 70. In the embodiment of Figure 3, the hydraulic motor 70 has been substituted in favor of an electric motor 140. Accordingly, in lieu of valve 128 there will be a switch wired to a source of electrical potential and to the motor 140. In either case the mower unit is set in motion. In addition various adjustments for the disposition of the mower unit 60 are available. By manipulating valve 122, the pivotal position of the mower unit 60 with respect to the frames 45 and 30 is alterable. This is occasioned by extending or retracting the extensible hydraulic device 84 in order to cause the mower unit 60 to pivot about the pin 50 through the interaction of the gear segment and rack as described previously herein.

The next adjustment is available by virtue of the presence of the hydraulic device 57, the latter being under the control of valve 117. By actuating the device 57 the second frame is adjusted pivotally by movement about pin 38, the pivotal movement being relative to the first frame 30. First frame 30 is adjusted by actuation of either or both of the hydraulic devices 99 and 95, valves 114 and 110, respectively, being used for this purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an adjustable mower adapted to be mounted on a motor vehicle in order to mow areas that are not otherwise accessible from the highway, the combination of a support adapted to be mounted on the vehicle, a lever having a first and a second end, means mounting said lever for pivotal movement between its ends on said support, extensible hydraulic devices at said ends of said lever, a first of said extensible hydraulic devices pivoted to said support and to said first end of said lever, the second of said hydraulic devices pivoted at one end to the second end of said lever, a first frame having inner and outer ends with the inner end mounted for pivotal movement on said support and movable about an axis which is parallel to the pivot axis of said lever, said second extensible hydraulic device pivotally attached at its other end to said first frame intermediate the ends of said first frame, a pivot pin at the outer end of said first frame, a second frame having upper and lower ends, said second frame mounted at a point between its upper and lower ends on said pivot pin, an extensible hydraulic device pivotally attached to an intermediate part of said first frame and the upper end of said second frame, and a mower unit carried by the lower end of said second frame.

2. In an adjustable mower adapted to be mounted on a motor vehicle in order to mow areas that are not otherwise accessible from the highway, the combination of a support having parts adapted to be mounted on opposite sides of the vehicle, a lever having a first and a second end, means mounting said lever for pivotal movement between its ends on said support, extensible hydraulic devices at said ends of said lever, a first of said extensible hydraulic devices pivoted to said support on one side of the vehicle and to said first end of said lever, the second of said hydraulic devices pivoted at one end to the second end of said lever, a first frame having inner and outer ends with the inner end mounted for pivotal movement on the part of said support on the opposite side of the vehicle and movable about an axis which is parallel to the pivot axis of said lever, said second extensible hydraulic device pivotally attached at its other end to said first frame intermediate the ends of said first frame, a pivot pin at the outer end of said first frame, a second frame having upper and lower ends, said second frame mounted at a point between its upper and lower ends on said pivot pin, an extensible hydraulic device pivotally attached to an intermediate part of said first frame and the upper end of said second frame, a pivot carried by the lower end of said second frame and having an axis which is parallel to the axis of the first mentioned pivot pin, a mower unit mounted for oscillatory movement about said pivot, said unit having a motor support, a motor on said motor support and operatively connected with said unit for actuating said unit, and means operatively connected with said mower unit and said second frame to tilt said mower unit about said pivot to selectively adjusted positions.

3. The adjustable mower of claim 2 wherein, said means operatively connected with said mower unit and said second frame include a hydraulic device pivoted at one end to said second frame, and mechanical means drivingly connecting the last mentioned hydraulic device to said mower unit for pivotally moving said mower unit in response to actuation of the last mentioned hydraulic device.

References Cited in the file of this patent
UNITED STATES PATENTS

| | | |
|---|---|---|
| 1,656,078 | Sheets | Jan. 10, 1928 |
| 1,911,516 | Landing | May 30, 1933 |
| 1,953,394 | Clapper | Apr. 3, 1934 |
| 2,291,987 | Rogers | Aug. 4, 1942 |
| 2,588,002 | Holmes | Mar. 4, 1952 |
| 2,588,003 | Holmes | Mar. 4, 1952 |
| 2,588,004 | Holmes | Mar. 4, 1952 |